(12) United States Patent
Wu (10) Patent No.: US 9,667,885 B2
(45) Date of Patent: May 30, 2017

(54) SYSTEMS AND METHODS TO ACHIEVE INTERACTIVE SPECIAL EFFECTS

(71) Applicant: Futurewei Technologies, Inc., Plano, TX (US)

(72) Inventor: Mingquan Wu, Princeton Junction, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 235 days.

(21) Appl. No.: 14/568,704

(22) Filed: Dec. 12, 2014

(65) Prior Publication Data

US 2016/0173788 A1 Jun. 16, 2016

(51) Int. Cl.
*H04N 7/18* (2006.01)
*H04N 5/262* (2006.01)
*H04N 5/247* (2006.01)

(52) U.S. Cl.
CPC ........... *H04N 5/2621* (2013.01); *H04N 5/247* (2013.01); *H04N 5/262* (2013.01)

(58) Field of Classification Search
CPC .............................. H04N 13/00; H04N 13/21
USPC ...................... 348/40–60; 375/240.11–240.26
See application file for complete search history.

(56) References Cited

U.S. PATENT DOCUMENTS

| 9,036,898 | B1 * | 5/2015 | Beeler | ................... | G06T 7/2033 |
| | | | | | 382/154 |
| 9,038,898 | B2 * | 5/2015 | Cooper | ............... | E05B 73/0017 |
| | | | | | 235/383 |
| 2002/0002077 | A1 | 1/2002 | Shimizu et al. | | |
| 2007/0074117 | A1 | 3/2007 | Tian et al. | | |
| 2012/0036544 | A1 * | 2/2012 | Chen | .................... | H04N 19/597 |
| | | | | | 725/109 |
| 2014/0085404 | A1 | 3/2014 | Kleinsteiber et al. | | |

FOREIGN PATENT DOCUMENTS

WO 0062552 A2 10/2000

OTHER PUBLICATIONS

Foreign Communication From a Counterpart Application, PCT Application No. PCT/CN2015/096819, English Translation of International Search Report dated Mar. 15, 2016, 7 pages.
Foreign Communication From a Counterpart Application, PCT Application No. PCT/CN2015/096819, English Translation of Written Opinion dated Mar. 15, 2016, 4 pages.

* cited by examiner

*Primary Examiner* — Andy Rao
(74) *Attorney, Agent, or Firm* — Conley Rose, P.C.

(57) ABSTRACT

Methods and systems facilitate efficient and effective special effects in video streaming. In one embodiment, an apparatus enables special effects by decoding video frames in accordance with a decoding process. The decoding process includes: accessing a plurality of streams of video (wherein each stream originates from a respective camera of a camera array) and decoding frames from the plurality of streams of video. A first stream from a first camera comprises: a first primary special effect predictive (SP) frame that is coded based upon a predictive (P) frame in the first stream; and a first secondary special effect predictive (SP) frame that is coded based upon a primary special effect predictive (SP) frame included in a second stream from a second camera. The method further comprises rendering a special effect using the primary and secondary special effect predictive (SP) frames.

20 Claims, 11 Drawing Sheets

SYSTEMS AND METHODS TO ACHIEVE INTERACTIVE SPECIAL EFFECTS

TECHNICAL FIELD

Embodiments of the present disclosure relate generally to the field of video special effects.

BACKGROUND

Numerous electronic technologies such as digital computers, calculators, audio devices, video equipment, and telephone systems facilitate increased productivity and reduce costs in analyzing and communicating data in most areas of business, science, education and entertainment. The systems typically involve communication of vast amounts of video information over communication networks in which bandwidth is limited. Conventional communication approaches frequently attempt to reduce or compress information through various coding schemes. However, traditional coding scheme attempts can be limited and problematic (e.g., attempts at special effects, etc.).

While conventional attempts at video and communication coding may reduce the amount of information conveyed over the network, they usually introduce significant processing overhead. Processing overhead can involve or occupy a significant amount of processing resources and thereby impact performance. Some schemes attempt to encode/decode frames in video streams and usually involve information from previous frames to encode/decode subsequent frames. Traditional attempts at changing from one video stream to another video stream usually involve performing coding operations again at a beginning or defined point of the new stream. These approaches can be problematic.

Video streaming over the internet is popular in recent years. Various internet streaming protocols (e.g., HTTP, etc.) take advantage of existing Internet infrastructure and often easily penetrate NAT and firewalls. However, conventional video streaming usually has strict bandwidth and delay requirements that make guaranteed quality of service (QoS) for streaming over a public Internet very challenging as network conditions often change constantly. For certain video streaming applications, such as sports, entertainment performances, tele-medicine and remote education, people may be interested in special effects such as freezing (e.g., bullet time, etc.) and sweeping. However, achieving special effects over the Internet is challenging. Various attempts at adaptive streaming technologies have been proposed (e.g., including Apple HTTP live streaming (HLS), Microsoft smooth streaming, etc), however existing adaptive streaming approaches or attempts (e.g., such as HTTP Live Streaming, Smooth Streaming, and DASH, etc.) do not typically provide specified special effects in their schemes.

SUMMARY OF THE INVENTION

Methods and systems for facilitating efficient and effective special effects in video streaming are described. In one embodiment, an apparatus includes: a processor that enables special effects by decoding video frames in accordance with a decoding process or method; and a memory that stores video information related to the rendering of the special effects. The memory also stores instructions for the processor to implement the special effects (e.g., interactive special effects such as frozen moment special effects, sweeping special effects, etc.). The process or method of rendering video in at least one implementation comprises: accessing a plurality of streams of video captured via a camera array (wherein each stream originates from a respective camera of the camera array) and decoding frames from a first stream of the plurality of streams of video, wherein said first stream is from a first camera. An exemplary first stream includes: an initial (I) frame decoded independently of other frames; a predictive (P) frame that is decoded based upon other frames in the first stream; a first primary special effect predictive (SP) frame that is coded based upon the predictive (P) frame in the first stream; and a first secondary special effect predictive (SP) frame that is coded based upon a primary special effect predictive (SP) frame included in a second stream of the plurality of streams of video and wherein the second stream is from a second camera. The method further comprises rendering a special effect using the primary special effect predictive (SP) frame of the first stream and a first secondary special effect predictive (SP) frame of the second stream. It is appreciated there can be a variety of camera array configurations. For example, the first and second cameras located adjacent to each other in a circle or straight line configuration within the camera array.

In one exemplary implementation, rendering a special effect comprises generating a frame to be displayed based on the primary special effect predictive (SP) frame of the first stream and the first secondary special effect predictive (SP) frame of the second stream. Rendering a plurality of display frames in one implementation is based on the first secondary special effect predictive (SP) frame of the second stream and a plurality of predictive (P) frames of the second stream. In one embodiment, the first stream further comprises a second secondary special effect predictive (SP) frame that is coded based upon a primary special effect predictive (SP) frame included in a third video stream of the plurality of video streams from a third camera, wherein the first and third cameras are adjacent to each other within the camera array. The rendering a special effect can further comprise rendering a frame to be displayed based on a primary special effect predictive (SP) frame of the second stream and a first secondary special effect predictive (SP) frame of a third stream of the plurality of video streams.

In another exemplary implementation, an encoding method is executed, wherein the encoding method comprises: receiving video captured by a plurality of cameras; executing encoding operations on the video captured by the plurality of cameras, wherein the encoding operations produce a plurality of video streams corresponding to the plurality of cameras. Each of the plurality of video streams respectively includes: a primary special effect predictive (SP) fame encoded based upon a (P) frame included in the same video stream as the primary special effect predictive (SP) frame; and a secondary special effect predictive (SP) frame encoded based upon another primary special effect predictive (SP) frame included in a different one of the plurality of video streams from the video stream that includes the secondary special effect predictive (SP) frame, wherein the secondary special effect predictive (SP) frame is operable to facilitate special effects rendering at a decode unit. The secondary special effect predictive (SP) frame is one of a plurality of secondary special effect predictive (SP) frames and the primary special effect predictive (SP) frame is one of a plurality of primary special effect predictive (SP) frames, wherein each respective one of the plurality of secondary special effect predictive (SP) frames is encoded based upon a corresponding one of the plurality of primary special effect predictive (SP) frames. It is appreciated that various other types of video frames may also be included in the plurality of video streams. For example, each of the plurality of video streams can include an initial (I) frame (that is encoded independently of other frames) and predictive (P) frames (that are encoded based upon other frames in a same video stream as the predictive (P) frames). The novel encoding/decoding approaches are compatible with a variety of standards. For example, the novel encoding approach is compatible with HTTP requirements.

BRIEF DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Methods and systems that facilitate efficient and effective coding operations associated with information in video streams are described. In one embodiment, special effect predictive (SP) frames are inserted in a plurality of video streams. The SP frames include primary SP frames and corresponding secondary SP frames. The SP frames enable efficient and effective coding operations when a presentation moves or changes from one video stream to another new video stream. The change in video streams can be performed with minimal or no decoding of past frames in the new video streams. A change between video streams can be associated with a change in view or perspective (e.g., camera view, etc.) and the change in view or perspective can be utilized to implement a variety of special effects (e.g., frozen moment effect, sweeping effect, etc.).

Figure 1:
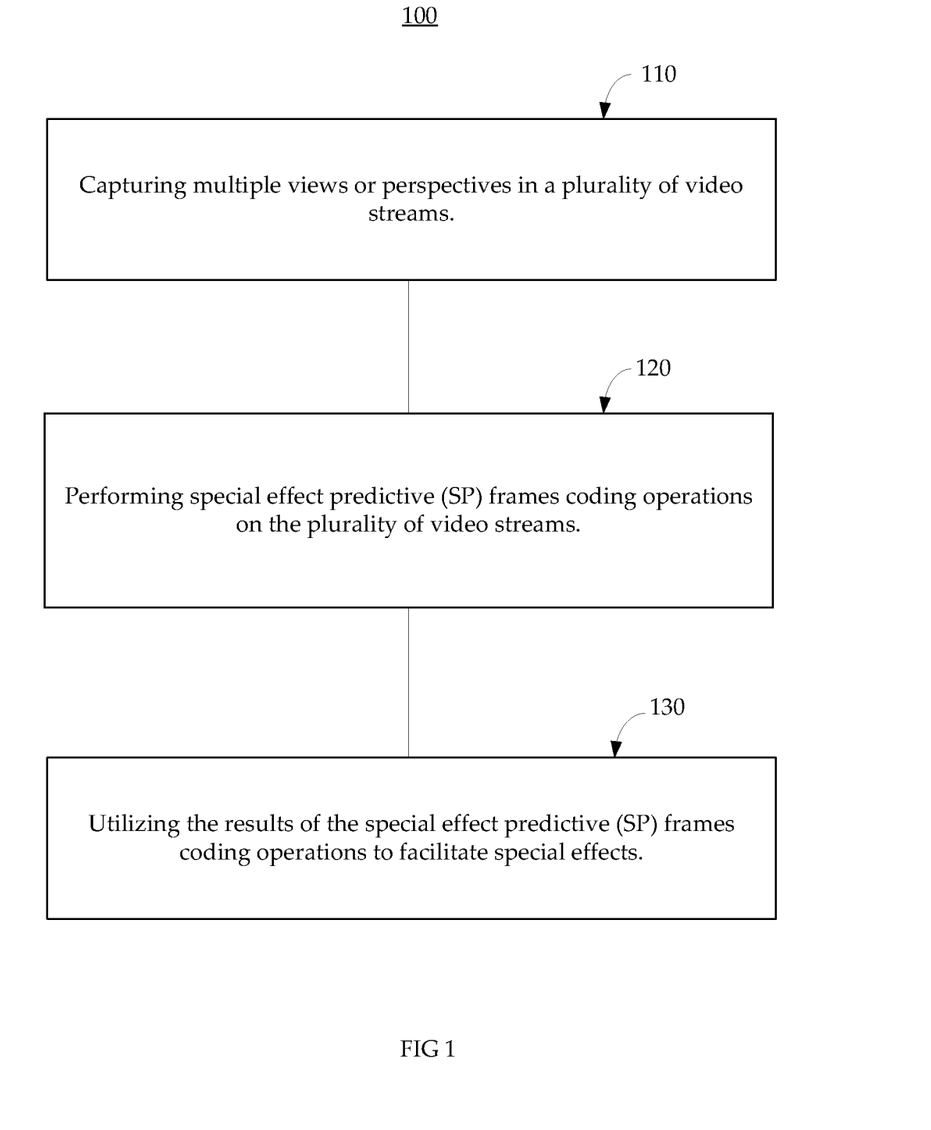
FIG. 1 is a flow diagram of an exemplary video process in accordance with one embodiment.

FIG. 1 is a block diagram of an exemplary video process 100 in accordance with one embodiment. Video process 100 can facilitate implementation of a variety of special effects. A general overview of the operations of exemplary video process 100 is initially presented with respect to FIG. 1 and additional explanation of new coding approaches is set forth in later portions of the detailed description.

In block 110, multiple views or perspectives are captured in a plurality of video streams. The multiple video streams are captured by a plurality of video cameras in a camera array. The different cameras in the camera array capture images of a scene from different viewpoints or perspectives.

In block 120, special effect predictive (SP) frame coding operations are performed on the plurality of video streams. In one embodiment, primary special effect predictive (SP) frames and secondary special effect predictive (SP) frames are inserted in the plurality of video streams. It is appreciated that a primary special effect predictive (SP) fame can be associated with a first view or perspective and a secondary special effect predictive (SP) frame can be associated with a second view or perspective. The primary special effect predictive (SP) fame and secondary special effect predictive (SP) frame can be utilized to "enter" or "leave" the video stream (e.g., move from one video stream to another video stream as part of implementing a special effect such as frozen moment, view sweeping, etc.). For instance, in one case, for each primary SP frame, two secondary SP frames are encoded, each using the primary SP frame of the camera's right and left neighbor, respectively.

In block 130, results of the special effect predictive (SP) frames coding operations are utilized to facilitate special effects. A variety of special effects can be implemented (e.g., such as frozen moment and view sweeping, etc.) that enrich a user's immersive multimedia experience. For instance, in frozen moment special effects, time is frozen while a view or perspective changes. And, in view sweeping special effects, time continues to "move" or change while a view or perspective changes. A user can change a view or perspective by starting from a current view and "rotating" clockwise or anti-clockwise sequentially through multiple viewpoints or perspectives by changing the presentation from being based on one video stream of one camera of the camera array to being based on another video stream of another camera of the camera array.

Figure 2:
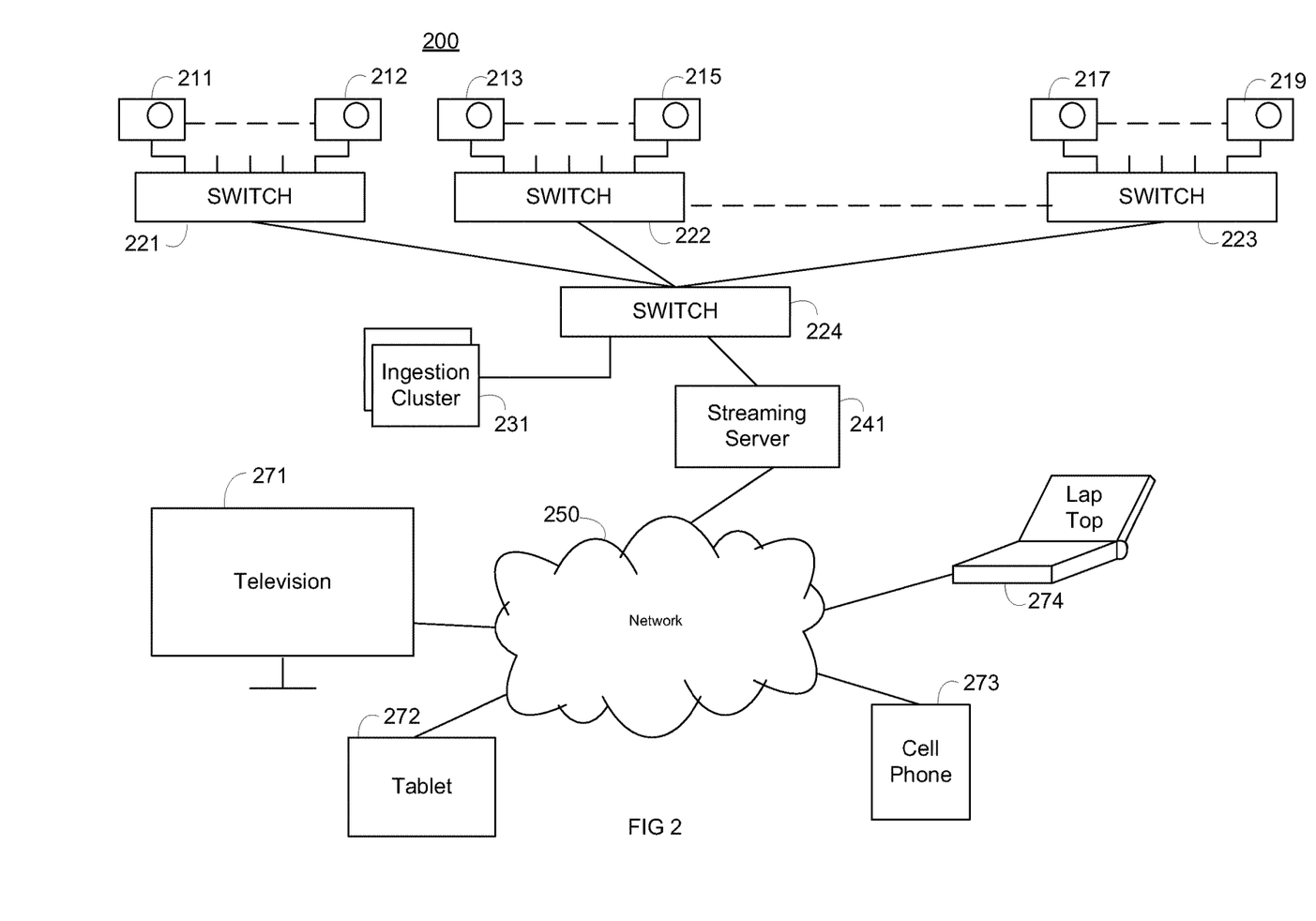
FIG. 2 is a system block diagram of one exemplary system in accordance with one embodiment of the present invention.

FIG. 2 is a block diagram of one exemplary system 200 in accordance with one embodiment of the present invention. System 200 includes an array of a plurality of cameras (e.g., 211, 212, 213, 215, 217, 219, etc.), switches (e.g., 221, 222, 223, 224, etc.), ingestion cluster 231, streaming server 241, network 250, and various presentation devices (e.g., television 271, table 272, cell hone 273, laptop 274, etc.) The cameras (e.g., 211, 212, 213, 215, 217, 219, etc.) can form a plurality of camera arrays (e.g., 213 through 215, 217 through 219, etc.) that captures various video information (e.g., different viewing perspectives related to a television show, a sporting event, etc.). The camera arrays can be arranged in a variety of configurations (e.g., in a line, in a circle, etc.). The video information is forwarded via various components (e.g., local area network, switches, etc.) to ingestion cluster 231 and streaming server 241. Ingestion cluster 231 can include a processor and a memory that are utilized in various encoding operations on video streams captured by the camera array. Ingestion cluster 231 can also perform various other video processing operations (e.g., denoising, color enhancement, etc.). The processed video stream information is sent to streaming server 241 which forwards it to network 250 (e.g., which can include multi-layers of switches or routers, internet servers, etc.). Network 250 can be part of the Internet. Network 250 in turn forwards the video stream information to the various presentation devices for presentation. The presentation devices can include a processor and a memory that are utilized in various decoding operations performed on encoded video streams received by the respective presentation devices. In one exemplary implementation, the video streaming is HTTP compliant and users of the respective presentation devices can retrieve the video stream information from the streaming server 241 via the HTTP compatible video streaming.

Dynamic adaptive streaming over HTTP (DASH) is a standard technology to merge existing adaptive streaming technologies to provide a unified file format and signaling mechanism for video streaming applications. DASH has specified file format and signaling mechanisms to allow a client to switch from one bit rate segment to another bit rate segment. In DASH, videos are segmented into small fragments and are pre-coded into different bit rates. Available video fragments and their bits rates are described in a media presentation description (MPD) file, which is downloaded to a client before video streaming starts. A client can switch to appropriate bit rate segments based on the available network bandwidth. This way, a client can gracefully down grade its QoS when bandwidth decreases, and gradually upgrade its QoS when more bandwidth becomes available. DASH has also attempted to include a scheme to allow a user to switch from one view to a different view, however, DASH has not included a method for a user to experience special effects through HTTP streaming. In traditional broadcast systems, special effects are achieved by broadcasting pre-processed video to users, but users cannot select their own starting points and end points for special effects. The novel method can include an extension to standards such as DASH that is compatible with HTTP technology and the novel approach facilitates interactive special effects.

Figure 3:
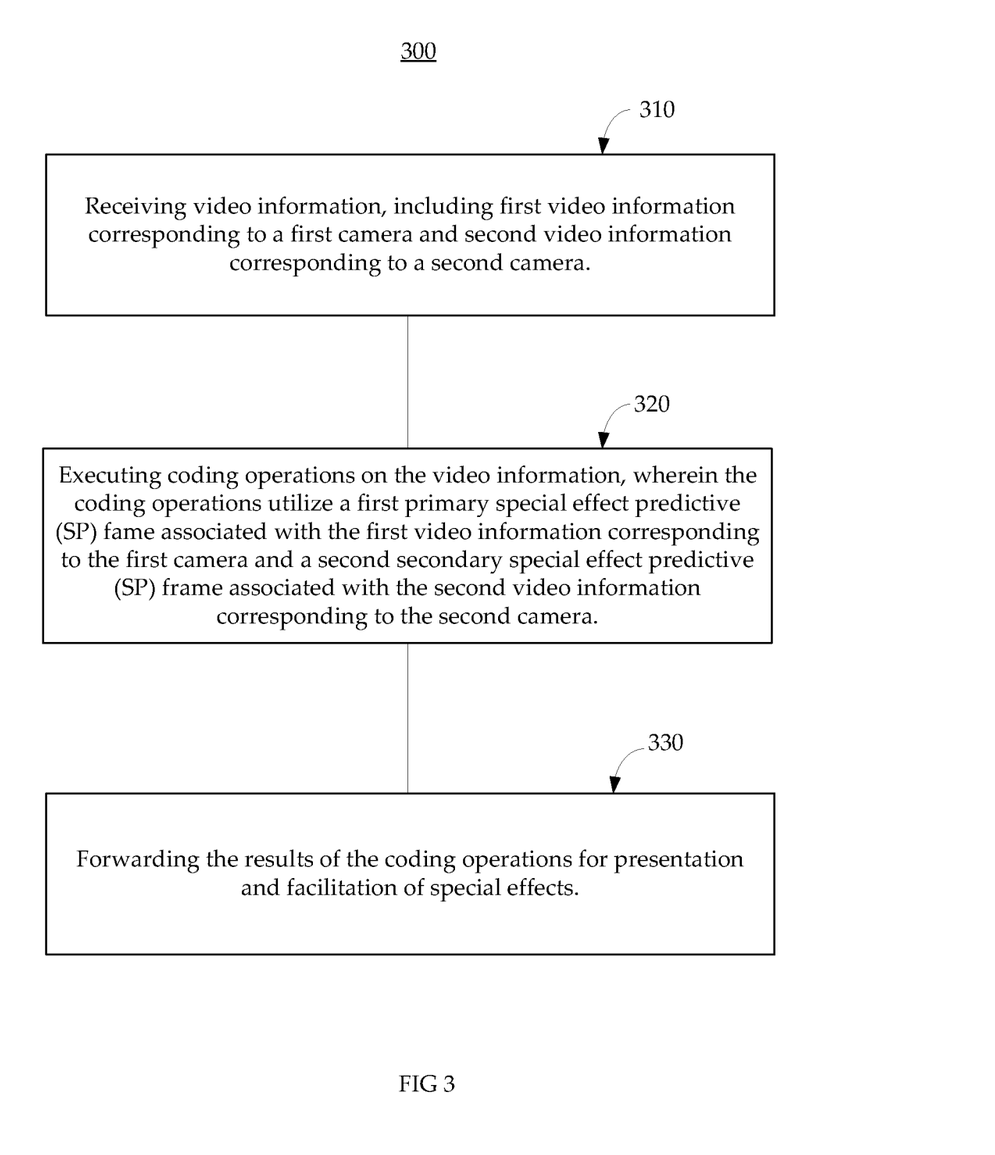
FIG. 3 is a flow diagram of an exemplary coding process in accordance with one embodiment.

FIG. 3 is a block diagram of an exemplary coding process 300 in accordance with one embodiment of the present invention.

In block 310, video information is received from a camera array. The video information includes information associated with a plurality of video streams. The plurality of video streams can include first video information associated with a first view or perspective and second video information associated with a second view or perspective. The plurality of views or perspectives can correspond to the camera array having a plurality of cameras. The video information can include first video stream information corresponding to a first camera and second video stream information corresponding to a second camera.

In block 320, coding operations are executed on the video information. The coding operations can include encoding and decoding. The coding operations utilize a first primary special effect predictive (SP) fame associated with the first video information corresponding to a first view or perspec-
tive and a second secondary special effect predictive (SP) frame associated with the second video information corresponding to a second view or perspective. The coding operations can utilize a second primary special effect predictive (SP) fame associated with the second video information corresponding to the second view or perspective. The coding operations can utilize a first secondary special effect predictive (SP) frame associated with the first video information corresponding to the first view or perspective. In one embodiment, the closest previous SP frames are downloaded and decoding includes the frames between the time of a special effect initiation and the time where SP frames are inserted.

In block 330, the results of the coding operations are forwarded for presentation. The results can be utilized to facilitate special effects in the presentation. The special effects can include for instance frozen moment special effects and sweeping special effects.

Figure 4:
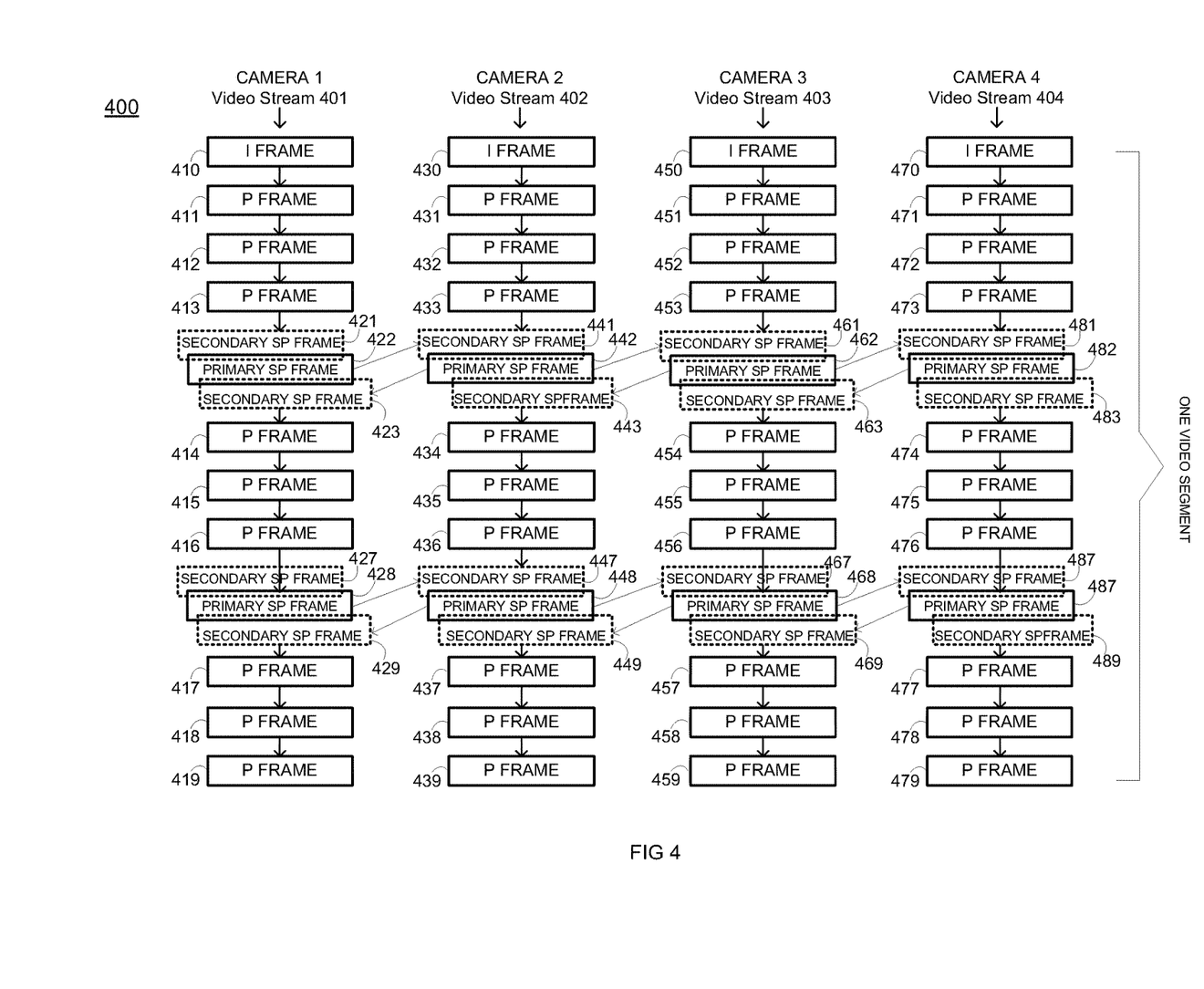
FIG. 4 is a block diagram of an exemplary video stream configuration in accordance with one embodiment.

FIG. 4 is a block diagram of exemplary video stream configuration 400 in accordance with one embodiment. Video stream configuration 400 includes video streams 401, 402, 403 and 404 corresponding to cameras 1, 2, 3 and 4 respectively of the camera array. Video stream 401 includes I frame 410, P frames 411 through 419 (e.g., 411, 412, 413, 414, 415, 416, 417, 418, and 419), and SP frames 421 through 429 (e.g., 421, 422, 423, 427, 428, and 429). Video stream 402 includes I frame 430, P frames 431 through 439 (e.g., 431, 432, 433, 434, 435, 436, 437, 438, and 439), and SP frames 441 through 449 (e.g., 441, 442, 443, 447, 448, and 449). Video stream 403 includes I frame 450, P frames 451 through 459 (e.g., 451, 452, 453, 454, 455, 456, 457, 458, and 459), and SP frames 461 through 469 (e.g., 461, 462, 463, 467, 468, and 469). Video stream 471 includes I frame 470, P frames 471 through 479 (e.g., 471, 472, 473, 474, 475, 476, 477, 478, and 479), and SP frames 481 through 489 (e.g., 481, 482, 483, 487, 488, and 489). The SP frames are inserted in the video streams at similar respective locations (e.g., with certain time intervals, etc.) in the video streams. A respective primary SP frame (e.g., 422, etc.) and two respective secondary SP frames (e.g., 421, 423, etc.) are encoded and inserted at the location. In one exemplary implementation, P frames (e.g., 412, etc.) are inserted in the video streams at time t. The primary SP frame (e.g., 422, etc.) is encoded using the previous P frame at time t-1 (e.g., 413, etc.) from the same camera as a reference frame or picture.

One secondary SP-frame (e.g., 441, etc.) is encoded using the primary SP frame (e.g., 422) from the left neighboring camera at time t as a reference picture; the other secondary SP-frame (e.g., 443, etc.) is encoded using the primary SP-frame (e.g., 462, etc.) from the right neighboring camera at time t as a reference picture. In one embodiment, based on the SP-frame encoding approach, the three SP frames (e.g., including one primary SP frame and two secondary SP frames, etc.) when decoded create a picture or images that is substantially similar or identical.

While the present embodiment is described with three SP frames at a particular point in a stream, it is appreciated the number or SP frames at a given point can vary. The number of SP frames can vary based upon the configuration or arrangement of the camera array. The example in FIG. 4 is for a camera array configured or arranged in a circle. In another embodiment, if the cameras are more in a straight line, then the cameras at the edge have only one neighbor and therefore have one primary SP frame and one secondary SP frame.

Based on a new special effect frame structure there is a vertical decoding path along a timeline, and also horizontal decoding paths in both directions from one vertical decoding path to another vertical decoding path at the places where SP frames are inserted. These horizontal decoding paths are used to achieve interactive special effects in accordance with embodiments of the present invention.

If frozen moment or view sweeping effect happens between an I frame and the first inserted SP frame, the client downloads the I frames and the pictures between the I frames and the special effects playback frames from the appropriate camera views. As I frames can be decoded independently, the I frame from the start camera view does not have to be stored in the client's playback cache. However, if frozen moment or view sweeping happens at a time after a SP frame, the horizontal decoding path starts from the primary SP frame immediately before the view switching point. During regular playback, a client stores the decoded last primary SP frame in memory. During frozen moment or view sweeping, a client downloads the secondary SP frames and one or more P/B frames for the camera views without having to download the whole video segment(s) that includes the playback pictures. This can be achieved using HTTP byte range requests. Index segments are the first downloaded to derive byte range information.

Figure 5:
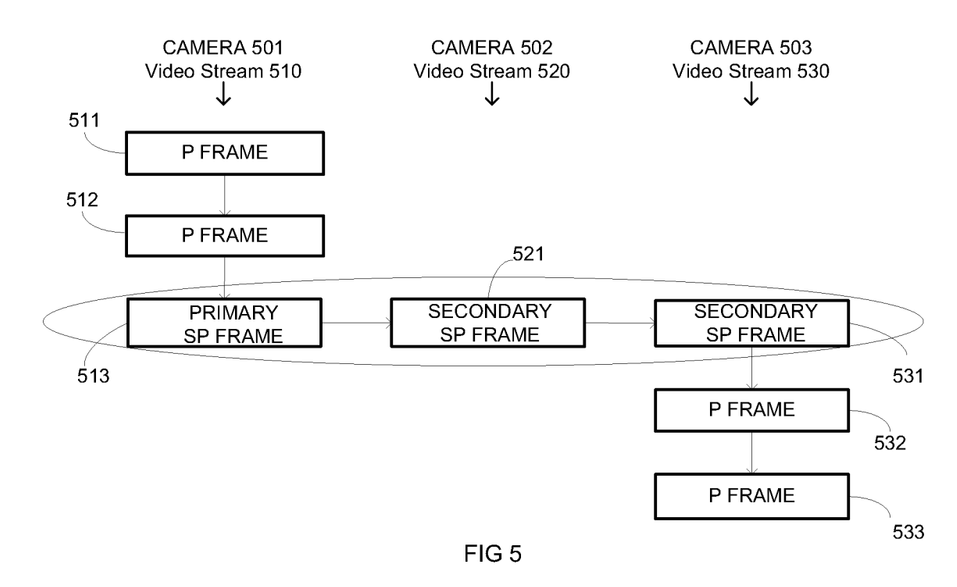
FIG. 5 is a block diagram of other exemplary video streams for achieving a frozen moment video effect in accordance with one embodiment.

FIG. 5 is a block diagram of exemplary video streams for achieving a frozen moment special effect in accordance with one embodiment. The video streams include video streams 510, 520 and 530 from cameras 501, 502 and 503. Video stream 510 includes P Frames 511 and 512 and primary SP frame 513. Video stream 520 includes secondary SP frame 521. Video stream 530 includes secondary SP frame 531 and P Frames 532 and 533. FIG. 5 is an example of achieving frozen moment special effects from camera 501 to camera 503 at locations where SP frames are inserted. A client performs regular playback from the starting camera view of camera 501 in video stream 510. At the location of the SP frames, the client downloads the primary SP frame 513 and decodes the frame and the decoding results are forwarded as a reference. In rotating the view to the right, the corresponding secondary SP frame 521 in video stream 520 from camera 502 and secondary SP frame 531 in video stream 530 from camera 503 are downloaded. The client can decode secondary SP frame 521 from a decoded picture of primary SP frame 513, and decode secondary SP frame 531 from decoded picture of secondary SP frame 521. The client can continue regular play back on video stream 530 as it can decode P frame 532 based on decoded picture of secondary SP frame 531.

Figure 6:
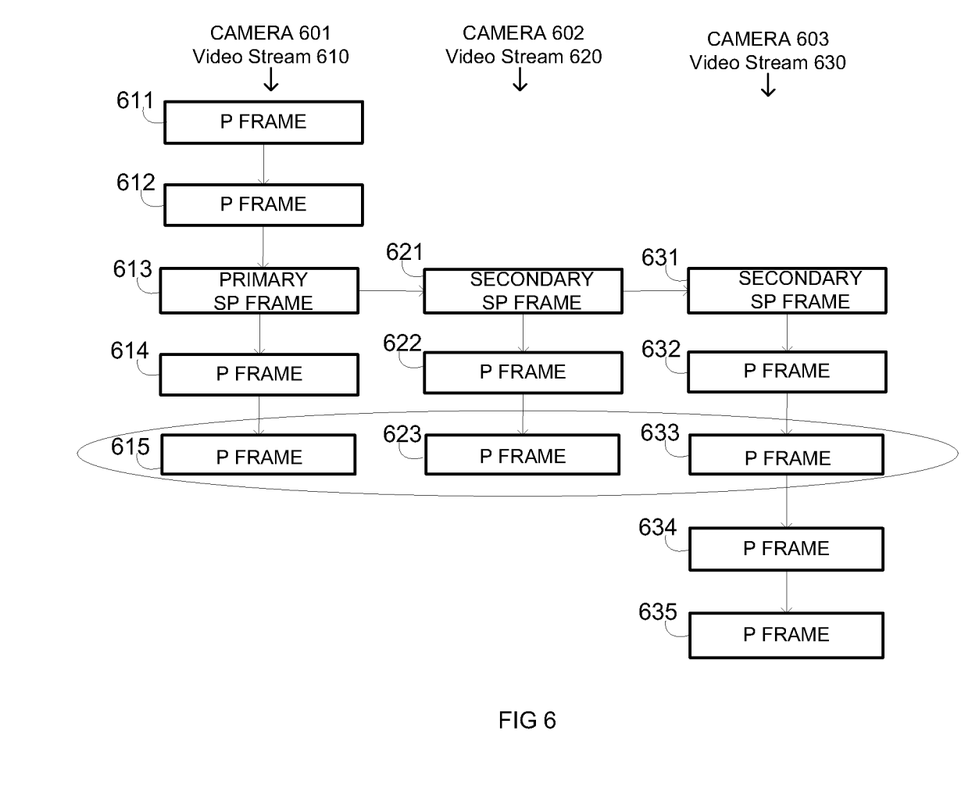
FIG. 6 is a block diagram of other exemplary video streams for achieving a frozen moment video effect in accordance with one embodiment.

FIG. 6 is a block diagram of exemplary video streams for achieving a frozen moment special effect in accordance with one embodiment. FIG. 6 is a block diagram of downloading the closest previous SP frames and intervening P frames in accordance with one embodiment. The video streams include video stream 610, 620 and 630 from cameras 601, 602 and 603 from the camera array. Video stream 610 includes primary SP frame 613 and P Frames 611, 612, 614 and 615. Video stream 620 includes secondary SP frame 621 and P Frames 622 and 623. Video stream 630 includes secondary SP frame 631 and P Frames 632, 633, 634 and 635. FIG. 6 is an example on achieving frozen moment from camera 601 to camera 603 at random locations (e.g., 615, 633, etc.) other than where SP frames (e.g., 613, 621 and 631) are inserted. To achieve frozen moments at the random locations, a client downloads the closest previous SP frames 613, 621 and 631 (e.g., based on the rotating direction) and the frames (e.g., 622 and 623, 632 and 633, etc) between the time of frozen moment and the time where SP frames are inserted. The client can decode 615 from the regular vertical decoding path. The client decodes 621 based on 613, 622 based on 621, and 623 based on 622. The client can decode frame 633 similarly (e.g., decoding 631 based on 623, 632 based on 631, and 633 based on 632). However, since the frozen moment special effect is triggered at a time corresponding to frames 615, 623 and 633, the frames 615, 623 and 633 are presented and frames 621, 622, 631 and 632 are not presented and are discarded.

Figure 7:
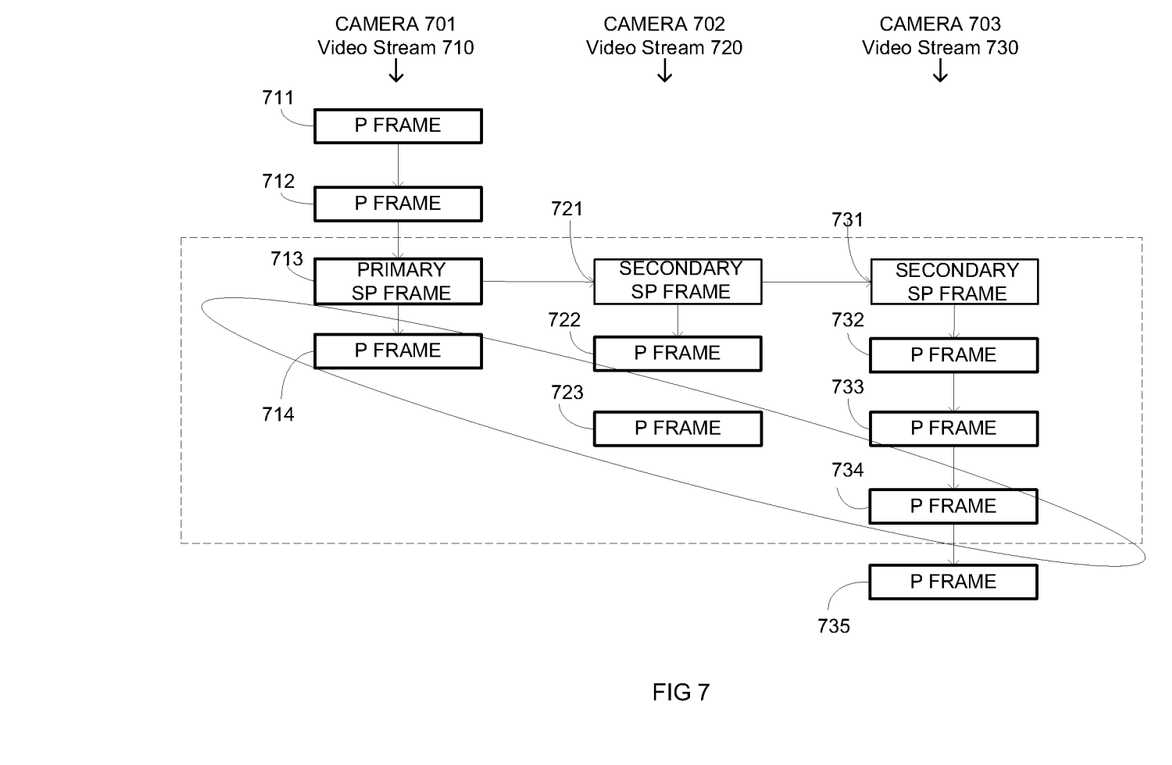
FIG. 7 is a block diagram of exemplary video streams for achieving sweeping in accordance with one embodiment.

The technique behind the view sweeping is similar to that of frozen moment. In order to decode a frame, a client decodes the previous P or B frames between the current frame the previous I frame or SP frame. FIG. 7 is a block diagram of exemplary video streams for achieving a sweeping special effect in accordance with one embodiment. The video streams include video stream 710, 720 and 730 from cameras 701, 702 and 703. Video stream 710 includes P Frames 711, 712 and 714, and primary SP frame 713. Video stream 720 includes secondary SP frame 721 and P Frames 722 and 723. Video stream 730 includes secondary SP frame 731 and P Frames 732, 733, 734 and 735. The sweeping includes P-Frames 714, 723 and 734. To achieve sweeping, a client downloads the closest previous SP frames 713, 721 and 731 (e.g., based on the rotating direction) and the frames (e.g., 722, 732, and 733) between the time of a respective frame involved in the sweep (e.g., 714, 723 and 734) and the time where SP frames are inserted.

Utilizing the novel SP frame approach, a user viewing a video can see or view substantially the same picture or image at the time of the SP frames regardless of the video path traversed to get to the SP frames. For example, a user sees substantially the same picture or image at the time of the SP frames 441, 442 and 443 regardless of path implemented to get to the SP frames. If the user is viewing the video based upon video stream 402 (e.g., going through P frame 433 to primary SP frame 442), the image or picture the user sees produced by primary SP frame 442 is substantially the same or identical to the image the user sees produced by secondary SP frame 441, when the user switches over from video stream 401 to video stream 402 (e.g., going from P frame 413 through the primary SP frame 422 and sweeping or switching over to secondary SP frame 441).

Figure 8:
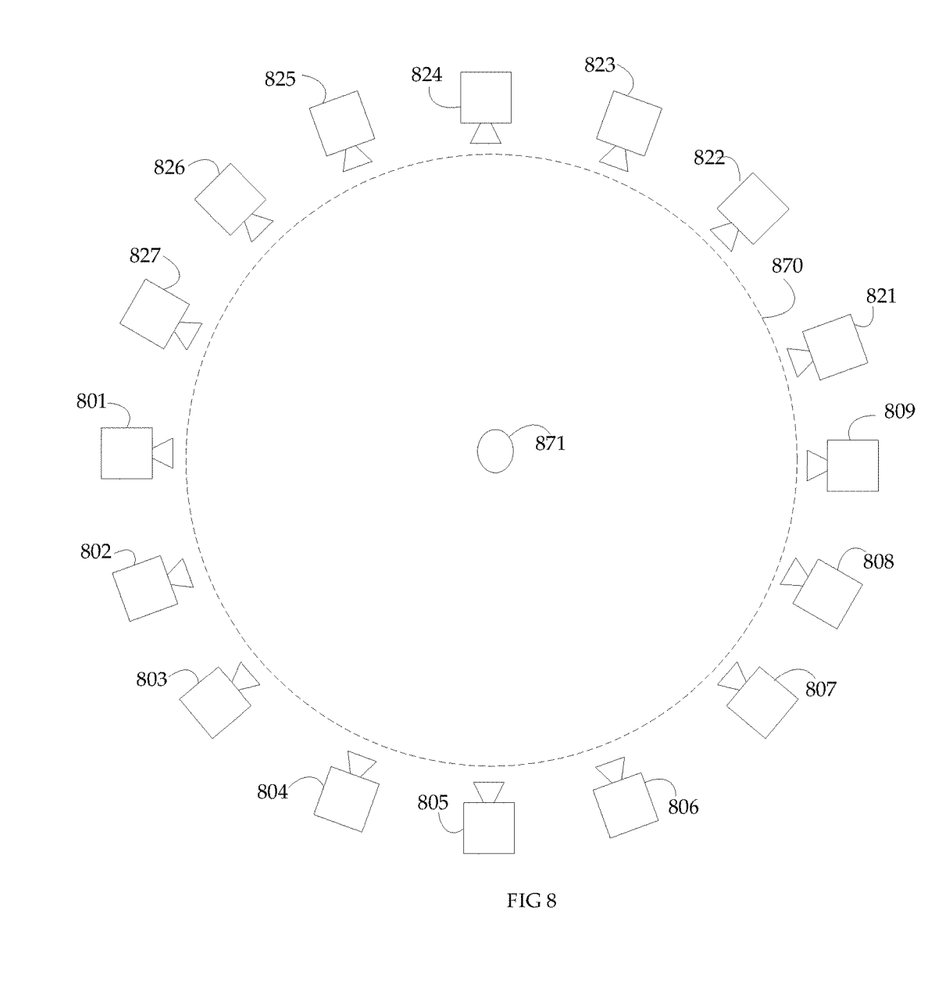
FIG. 8 is a top view block diagram of an exemplary implementation of a camera set up in accordance with one embodiment.

FIG. 8 is a top view block diagram of an exemplary implementation of a camera set up in accordance with one embodiment. FIG. 8 includes cameras 801, 802, 803, 804, 805, 806, 807, 808, 809, 821, 822, 823, 824, 825, 826, and 827. The cameras are configured in a camera array. The cameras capture different view points of a picture or image of a scene 870 that includes an object 871. In one exemplary implementation, a sporting event related scene is being captured by the cameras and object 871 is a player participating in the event. For a period or duration of the game the cameras focus on the object 871 or player (e.g., named Mark with number 15). It is appreciated that in some embodiments the cameras in the camera array are closely located to one another. Camera 801 captures a front view of player 871, camera 805 captures a side view, and camera 809 captures a back view.

Figure 9:
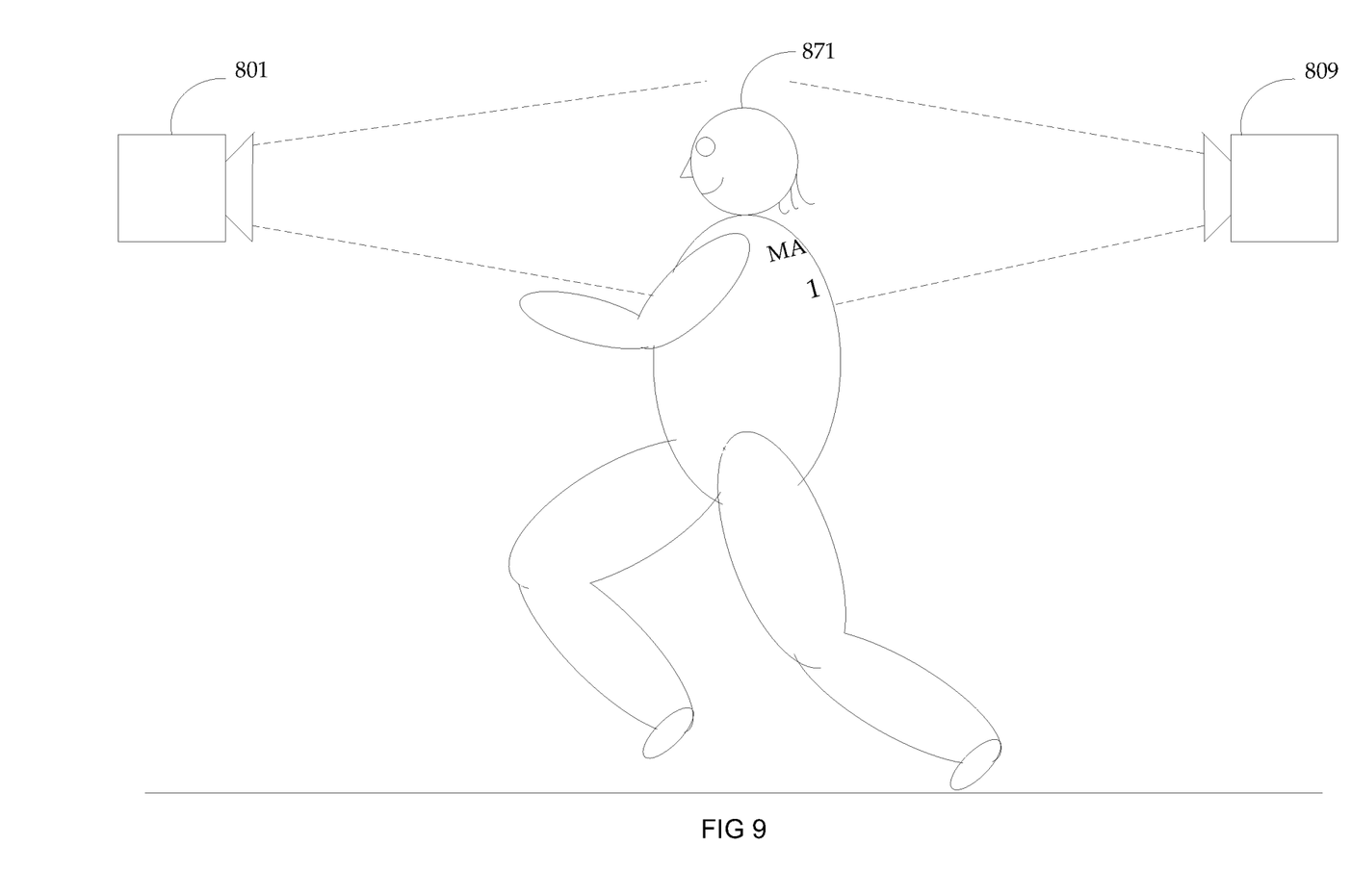
FIG. 9 is a side view block diagram of an exemplary implementation of a camera set up in accordance with one embodiment.

FIG. 9 is a partial side view block diagram of an exemplary implementation of a camera set up in accordance with one embodiment. It is appreciated that a variety of camera array configurations can be utilized (e.g., there can be more cameras, the cameras in a camera array can be closely located to one another, etc.). FIG. 9 illustrates the player 871 running in the direction of camera 801 and away from camera 809. Camera 801 captures a front view of player 871 and camera 809 captures a back view of player 871. It is appreciated that the side view illustrated in FIG. 9 is from the same view point as the view point of camera 805.

Figure 10:
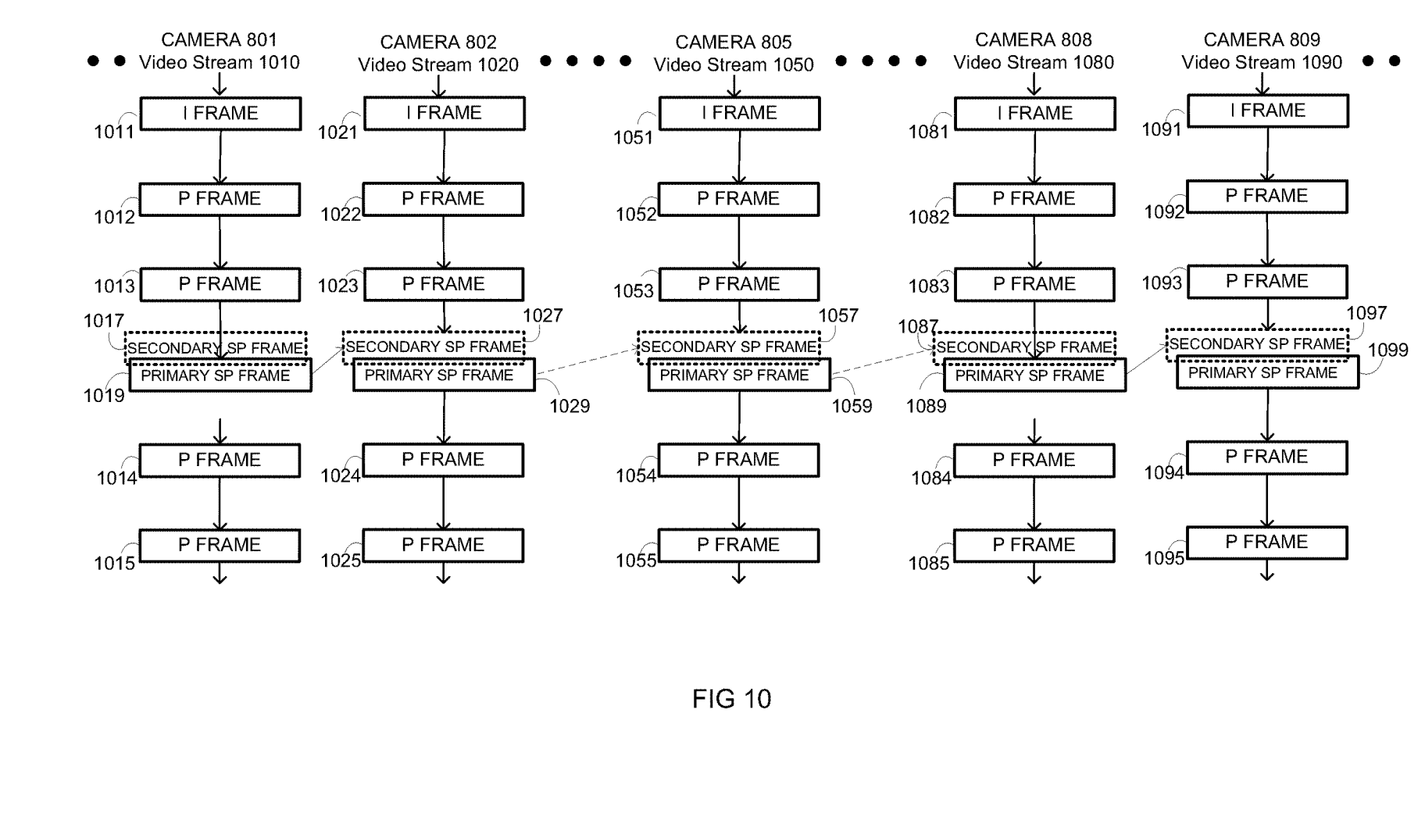
FIG. 10 is a block diagram of exemplary video streams in accordance with one embodiment.

FIG. 10 is a block diagram of exemplary video streams in accordance with one embodiment. Video stream 1010 is associated with camera 801 and video stream 1010 includes: I frame 1011; P frames 1012, 1013, 1014, and 1015; primary SP frame 1019; and secondary SP frame 1017. Video stream 1020 is associated with camera 802 and video stream 1020 includes: I frame 1021; P frames 1022, 1023, 1024, and 1025; primary SP frame 1029; and secondary SP frame 1027. Video stream 1050 is associated with camera 805 and video stream 1050 includes: I frame 1051; P frames 1052, 1053, 1054, and 1055; primary SP frame 1059; and secondary SP frame 1057. Video stream 1080 is associated with camera 808 and video stream 1080 includes: I frame 1081; P frames 1082, 1083, 1084, and 1085; primary SP frame 1089; and secondary SP frame 1087. Video stream 1090 is associated with camera 809 and video stream 1090 includes: I frame 1091; P frames 1092, 1093, 1094, and 1095; primary SP frame 1099; and secondary SP frame 1097. It is appreciated there can be other view streams (not shown) associated with other cameras.

Regardless of which camera (e.g., 801, 805, 809, etc.) and corresponding video stream (e.g., 1010, 1050, 1090, etc.) a user traverses to get to the SP frames, the image or picture presentation in the respective video stream at the time of the SP frames is of the "same" object (e.g., different perspectives of the same object or image, etc.).

Figure 11:
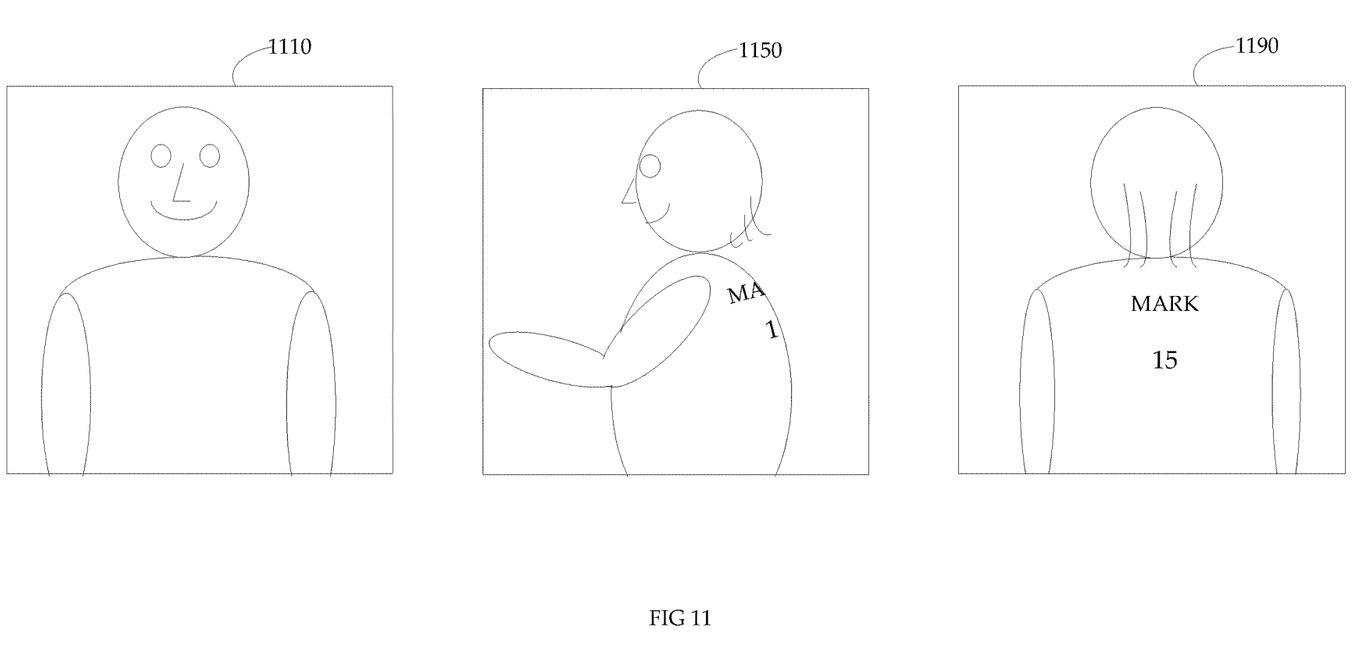
FIG. 11 is a block diagram of exemplary presentations or images at a time corresponding to particular sets of SP frames in accordance with one embodiment.

FIG. 11 is a block diagram of exemplary presentations or images 1110, 1150, and 1190 at a time corresponding to particular sets of SP frames. Image 1110 is rendered in accordance with video stream 1010 corresponding to a front view point captured by camera 801. Image 1110 is rendered using either primary SP frame 1119 or secondary SP frame 1117 and is the same regardless of which one is used to render image 1110. Image 1150 is rendered in accordance with video stream 1050 corresponding to a side view point captured by camera 805. Image 1150 is rendered using either primary SP frame 1159 or secondary SP frame 1157 and is the same regardless of which one is used to render image 1150. Image 1190 is rendered in accordance with video stream 1090 corresponding to a front view point captured by camera 809. Image 1190 is rendered using either primary SP frame 1199 or secondary SP frame 1197 and is the same regardless of which one is used to render image 1190.

In one embodiment, the ability to utilize either the primary SP frame or a secondary SP frame to render a presentation enables switching between the video streams. For ease of explanation, one exemplary implementation using front and back views is described. It is appreciated that other view points associated with other cameras can be implemented (e.g., side views with cameras 805, 803, 824, 823, etc.). For example, if a user is initially viewing the player 871 from the front using video stream 1010, I frame 1011, P frames 1012 and 1013 are used in decoding and presenting the image. When the stream gets to the SP frames, if the user does not trigger a switch in the streams, then the presentation continues using primary SP frame 1019 and the front view image 1110 is presented. If the user does trigger a switch in the stream to stream 1090, then the presentation uses secondary SP frame 1097 and the back view image 1090 is presented. If the user initially views the player 871 from the back using video stream 1090, I frame 1091, P frames 1092 and 1093 are used in decoding and presenting the image. When the video stream 1090 gets to the SP frames, if the user does not trigger a switch in the streams, then the presentation continues using primary SP frame 1099 and the back view presentation 1090 is presented. Thus, regardless of whether the user is previously using video stream 1010 or 1090 to view a presentation, if the user either continues with a back view or triggers a switch to a back view at the SP frame time the same image 1090 is presented. For ease of explanation, the video streams in FIG. 10 are shown with one secondary SP frame in a video stream. It is appreciated that additional secondary SP frames can be inserted at a primary SP frame (e.g., similar to FIG. 4 which has tow SP frames inserted at a primary SP frame, etc.). Similarly utilizing the additional SP frames, regardless of whether the user is previously using video stream 1010 or 1090 to view a presentation, if the user continues with a front view or triggers a switch to a front view at the SP frame time the same image 1010 is presented.

In one embodiment, the video data is compressed before it is streamed through networks and the embodiments of the present invention are compatible with a variety of coding operations in addition to SP frame coding. Video compression is achieved through a coding process (e.g., to eliminate its spatial and temporal redundancy, etc.). Independent (I) frames are encoded and decoded independently without reference to other frames or pictures. The P frames and B frames are not encoded or decoded independently. To encode a P frame, a motion compensated predicted frame from one or more previous frames is first constructed and the difference information between the current picture and the predicted picture is then coded. To encode a B frame, a predicted frame can be constructed from previous and future pictures. To decode a P frame or B frame, reference frames are first received and decoded. Usually it costs much more bits to encode an I frame than a P or B frame. A coded video stream can include successive groups of pictures (GOP). A GOP can specify the order in which I, P, B frames are arranged and usually starts with an I frame. In HTTP streaming, a user may switch from one bit stream segment to another bit stream segment, or from one camera view to another camera view. For different types of frames, I frames are coded independently and can be used as bite rate or view switching points. Encoding I frames costs more bits than P and B frames and inserting more I frames into a video stream may increase the bandwidth significantly.

The present SP frames of embodiments of the present invention are compatible with previous SP and SI frames approaches. SP-frames can be coded using a different encoding process than that used by P frames. One feature of SP-frames is that frames can be reconstructed when different reference frames are used for prediction. The novel approaches are also compatible with merge frames (M-frames) using distributed source coding for multi-view switching. Using an SP-frame and M-frame can achieve similar quality as I-frame but use much less bandwidth.

Embodiments described herein may be discussed in the general context of computer-executable instructions, such as program modules, residing on some form of computer-readable storage medium executed by one or more computers or other devices. By way of example, and not limitation, computer-readable storage media may comprise non-transitory computer-readable storage media. Non-transitory computer-readable storage media includes all computer-readable media except for a transitory, propagating signal. Computer-readable storage media includes volatile and nonvolatile, removable and non-removable media implemented in any method or technology for storage of information such as computer-readable instructions, data structures, program modules or other data. Generally, program modules include routines, programs, objects, components, data structures, etc., that perform particular tasks or implement particular abstract data types. The functionality of the program modules may be combined or distributed as desired in various embodiments.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of rendering video, the method comprising:
   accessing a plurality of streams of video captured via a camera array, wherein each stream originates from a respective camera of the camera array;
   decoding frames from a first stream of the plurality of streams of video, wherein the first stream is from a first camera and the first stream comprises:
      an initial (I) frame decoded independently of other frames in the first stream,
      a predictive (P) frame that is decoded based upon the other frames in the first stream,
      a first primary special effect predictive (SP) frame of the first stream that is coded based upon the P frame in the first stream, and
      a first secondary SP frame of the first stream that is coded based upon a primary SP frame included in a second stream of the plurality of streams of video and wherein the second stream is from a second camera; and
   rendering a special effect using the primary SP frame of the first stream and a first secondary SP frame of the second steam to cause the special effect to begin in the first stream at the primary SP frame of the first stream and end in the second stream at the first secondary SP frame of the second stream, wherein the first and second cameras are adjacent to each other within the camera array.

2. The method of claim 1, wherein the first stream further comprises a second secondary SP frame of the first stream that is coded based upon a primary SP frame included in a third video stream of the plurality of video streams from a third camera wherein the first and third cameras are adjacent to each other within the camera array.

3. The method of claim 1, wherein the special effect is a frozen moment special effect.

4. The method of claim 1, wherein the special effect is a sweeping special effect.

5. The method of claim 1, wherein the rendering the special effect comprises generating a frame to be displayed based on the primary SP frame of the first stream and the first secondary SP frame of the second stream.

6. The method of claim 1, further comprising rendering a plurality of display frames based on the first secondary SP frame of the second stream and a plurality of P frames of the second stream.

7. The method of claim 5, wherein the rendering the special effect further comprises rendering the frame to be displayed based on primary SP frame of the second stream and a first secondary SP frame of a third stream of the plurality of video streams.

8. An apparatus comprising:
   a processor that decodes video frames in accordance with a decoding process, the decoding process including:
      accessing a plurality of streams of video captured via a camera array wherein each stream originates from a respective camera of the camera array,
      decoding frames from a first stream of the plurality of streams of video, wherein the first stream is from a first camera and the first stream comprises:
         an initial (I) frame decoded independently of other frames in the first stream,
         a predictive (P) frame that is decoded based upon the other frames in the first stream,
         a first primary special effect predictive (SP) frame of the first stream that is coded based upon the P frame in the first stream, and
         a first secondary SP frame of the first stream that is coded based upon a primary SP frame included in a second stream of the plurality of streams of video and wherein the second stream is from a second camera, and
      rendering a special effect using the primary SP frame of the first stream and a first secondary SP frame of the second stream to cause the special effect to begin in the first stream at the primary SP frame of the first stream and end in the second stream at the first secondary SP frame of the second stream, wherein the first and second cameras are adjacent to each other within the camera array; and
   a memory that stores video information related to the rendering of the special effect and instructions for the processor to implement the special effect, wherein the special effect is an interactive special effect.

9. The apparatus of claim 8, wherein the first stream further comprises a second secondary SP frame of the first stream that is coded based upon a primary SP frame included in a third video stream of the plurality of video streams from a third camera wherein the first and third cameras are adjacent to each other within the camera array.

10. The apparatus of claim 8, wherein the special effect is a frozen moment special effect.

11. The apparatus of claim 8, wherein the special effect is a sweeping special effect.

12. The apparatus of claim 8, wherein the rendering the special effect comprises generating a frame to be displayed based on the primary SP frame of the first stream and the first secondary SP frame of the second stream.

13. The apparatus of claim 8, wherein the decoding process further comprises rendering a plurality of display frames based on the first secondary SP frame of the second stream and a plurality of P frames of the second stream.

14. The apparatus of claim 12, wherein the rendering the special effect further comprises rendering a frame to be displayed based on a first secondary SP frame of a third stream of the plurality of video streams.

15. An encoding method comprising:
   receiving video captured by a plurality of cameras; and
   executing encoding operations on the video captured by the plurality of cameras, wherein the encoding operations produce a plurality of video streams corresponding to the plurality of cameras, wherein each of the plurality of video streams respectively includes:
      a primary special effect predictive (SP) frame encoded based upon a predictive (P) frame included in the same video stream as the primary SP frame, and
      a secondary SP frame encoded based upon another primary SP frame included in a different one of the plurality of video streams from the video stream that includes the secondary SP frame, wherein the secondary SP frame is operable to facilitate rendering a special effect at a decode unit, and wherein the special effects render beginning in a first stream of the plurality of video streams at a primary SP frame of the first stream and end in a second stream of the plurality of video streams at a first secondary SP frame of the second stream.

16. The method of claim 15, wherein the special effect is a frozen moment special effect.

17. The method of claim 15, wherein the special effect is a sweeping special effect.

18. The method of claim 15, wherein the secondary SP frame is one of a plurality of secondary (SP) frames and the primary SP frame is one of a plurality of primary SP frames, wherein each respective one of the plurality of secondary SP frames is encoded based upon a corresponding one of the plurality of primary SP frames.

19. The method of claim 15, wherein each of the plurality of video streams further respectively includes an initial (I) frame that is encoded independently of other frames and P frames that are encoded based upon other frames in a same video stream as the P frames.

20. The method of claim 15, wherein the encoding is compatible with dynamic adaptive streaming over hypertext transfer protocol (HTTP) (DASH) requirements.

* * * * *

UNITED STATES PATENT AND TRADEMARK OFFICE
CERTIFICATE OF CORRECTION

PATENT NO. : 9,667,885 B2
APPLICATION NO. : 14/568704
DATED : May 30, 2017
INVENTOR(S) : Mingquan Wu It is certified that error appears in the above-identified patent and that said Letters Patent is hereby corrected as shown below:

In the Claims

Column 11, Lines 15-41 Claim 1, should read:
1. A method of rendering video, the method comprising:
    accessing a plurality of streams of video captured via a camera array, wherein each stream originates from a respective camera of the camera array;
    decoding frames from a first stream of the plurality of streams of video, wherein the first stream is from a first camera and the first stream comprises:
        an initial (I) frame decoded independently of other frames in the first stream,
        a predictive (P) frame that is decoded based upon the other frames in the first stream,
        a first primary special effect predictive (SP) frame of the first stream that is coded based upon the P frame in the first stream, and
        a first secondary SP frame of the first stream that is coded based upon a primary SP frame included in a second stream of the plurality of streams of video and wherein the second stream is from a second camera; and
    rendering a special effect using the primary SP frame of the first stream and a first secondary SP frame of the second stream to cause the special effect to begin in the first stream at the primary SP frame of the first stream and end in the second stream at the first secondary SP frame of the second stream, wherein the first and second cameras are adjacent to each other within the camera array.

Column 11, Lines 60-64, Claim 7, should read:
7. The method of claim 5, wherein the rendering the special effect further comprises rendering the frame to be displayed based on the primary SP frame of the second stream and a first secondary SP frame of a third stream of the plurality of video streams.

Signed and Sealed this
Third Day of October, 2017

Joseph Matal
*Performing the Functions and Duties of the*
*Under Secretary of Commerce for Intellectual Property and*
*Director of the United States Patent and Trademark Office*